(12) United States Patent
Sandstrom

(10) Patent No.: US 10,848,546 B2
(45) Date of Patent: *Nov. 24, 2020

(54) DIRECT BINARY FILE TRANSFER BASED NETWORK MANAGEMENT SYSTEM FREE OF MESSAGING, COMMANDS AND DATA FORMAT CONVERSIONS

(71) Applicant: Mark Henrik Sandstrom, Helsinki (FI)

(72) Inventor: Mark Henrik Sandstrom, Helsinki (FI)

(73) Assignee: Optimum Communications Services, Inc., Jersey City, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/782,436

(22) Filed: Feb. 5, 2020

(65) Prior Publication Data
US 2020/0177471 A1    Jun. 4, 2020

Related U.S. Application Data

(63) Continuation of application No. 15/912,603, filed on Mar. 6, 2018, now Pat. No. 10,567,474, which is a
(Continued)

(51) Int. Cl.
*H04L 29/08*    (2006.01)
*H04L 12/24*    (2006.01)
(Continued)

(52) U.S. Cl.
CPC .......... *H04L 67/06* (2013.01); *G06F 11/0709* (2013.01); *G06F 11/0751* (2013.01);
(Continued)

(58) Field of Classification Search
None
See application file for complete search history.

(56) References Cited

U.S. PATENT DOCUMENTS

| 5,365,514 A | 11/1994 | Hershey et al. |
| 5,506,712 A | 4/1996 | Sasayama et al. |

(Continued)

FOREIGN PATENT DOCUMENTS

| EP | 1045548 A2 | 10/2000 |
| EP | 1047222 A1 | 10/2000 |
| GB | 2301717 A | 12/1996 |

OTHER PUBLICATIONS

Kaplan F. et al., "A Transition Architecture to Sonet Networks," Global Telecommunications Conference, Dec. 2-5, 1990, pp. 161-165 vol. 1. IEEE San Diego, CA.
(Continued)

*Primary Examiner* — Scott B Christensen (57) ABSTRACT

Telecommunication network management operations are performed based on accessing network management data (NMD) files via GUIs and general purpose computers including a network management system (NMS) server, and automatic routines for transferring binary NMD files between the general purpose computers and remote network elements (NEs) being managed. A system user produces configuration files at the NMS server for NEs using a network management GUI, and the hardware of NEs automatically complete the network management operations indicated by the NMD files transferred to them from the NMS server and produce their status files to the NMS server. The network management GUI displays network status based on the latest NE status files at the NMS server. This provides direct, binary file transfer based NMS communication that avoids the complexity and restrictions of intermediate messaging protocols or transaction languages and conversions thereof.

20 Claims, 3 Drawing Sheets

Related U.S. Application Data continuation of application No. 14/931,884, filed on Nov. 4, 2015, now Pat. No. 9,917,883, which is a continuation of application No. 14/038,685, filed on Sep. 26, 2013, now Pat. No. 9,182,997, which is a continuation of application No. 11/566,178, filed on Dec. 1, 2006, now abandoned.

(60) Provisional application No. 60/866,208, filed on Nov. 16, 2006.

(51) Int. Cl.
*H04L 29/06* (2006.01)
*G06F 11/07* (2006.01)

(52) U.S. Cl.
CPC ...... *G06F 11/0769* (2013.01); *H04L 41/0609* (2013.01); *H04L 41/22* (2013.01); *H04L 41/24* (2013.01); *H04L 67/1097* (2013.01); *H04L 67/42* (2013.01); *H04L 41/0853* (2013.01); *H04L 41/20* (2013.01)

(56) References Cited

U.S. PATENT DOCUMENTS

| | | | |
|---|---|---|---|
| 5,526,349 A | 6/1996 | Diaz et al. |
| 5,533,116 A | 7/1996 | Vesterinen |
| 5,566,335 A | 10/1996 | Nash et al. |
| 5,761,429 A | 6/1998 | Thompson |
| 5,901,320 A | 5/1999 | Takahashi et al. |
| 6,205,563 B1 | 3/2001 | Lewis |
| 6,347,330 B1 | 2/2002 | Dawson et al. |
| 6,654,802 B1 | 11/2003 | Oliva et al. |
| 6,674,714 B1 | 1/2004 | Mochizuki et al. |
| 6,697,373 B1 | 2/2004 | Sandstrom |
| 6,714,977 B1 | 3/2004 | Fowler et al. |
| 6,807,186 B2 | 10/2004 | Dally et al. |
| 6,883,084 B1 | 4/2005 | Donohoe |
| 6,888,841 B1 | 5/2005 | Ozaki |
| 6,961,343 B1 | 11/2005 | Yamazaki |
| 7,051,097 B1 | 5/2006 | Pecina |
| 7,058,704 B1 | 6/2006 | Mangipudi et al. |
| 7,110,358 B1 | 9/2006 | Clinton et al. |
| 7,146,568 B2 | 12/2006 | Richardson |
| 7,181,436 B1 | 2/2007 | Conley et al. |
| 7,251,690 B2 | 7/2007 | Williams |
| 7,349,414 B2 | 3/2008 | Sandstrom |
| 7,363,359 B1 | 4/2008 | Tripathy et al. |
| 7,567,585 B2 | 7/2009 | Ishii |
| 7,664,848 B2 | 2/2010 | Misbach |
| 8,452,906 B2 | 5/2013 | Grohman |
| 8,495,244 B2 | 7/2013 | Bonar et al. |
| 2001/0038607 A1 | 11/2001 | Honda |
| 2002/0029266 A1 | 3/2002 | Tse et al. |
| 2002/0049608 A1 | 4/2002 | Hartsell |
| 2002/0054169 A1 | 5/2002 | Richardson |
| 2002/0080446 A1 | 6/2002 | Derventzis |
| 2002/0099669 A1 | 7/2002 | Lauer |
| 2003/0069959 A1 | 4/2003 | Tse |
| 2003/0074429 A1 | 4/2003 | Gieseke |
| 2003/0074430 A1 | 4/2003 | Gieseke |
| 2003/0225876 A1 | 12/2003 | Oliver |
| 2004/0042495 A1 | 3/2004 | Sandstrom |
| 2004/0064542 A1 | 4/2004 | Williams |
| 2004/0133581 A1 | 7/2004 | Shinjo |
| 2004/0139308 A1 | 7/2004 | Foster et al. |
| 2004/0172412 A1 | 9/2004 | Files |
| 2005/0102529 A1 | 5/2005 | Buddhikot |
| 2005/0125492 A1 | 6/2005 | Yu |
| 2005/0154801 A1 | 7/2005 | Neuman |
| 2005/0198247 A1 | 9/2005 | Perry et al. |
| 2005/0259571 A1 | 11/2005 | Battou |
| 2006/0005228 A1 | 1/2006 | Matsuda |
| 2006/0029085 A1 | 2/2006 | Booman |
| 2006/0155825 A1 | 7/2006 | Torii |
| 2006/0161674 A1 | 7/2006 | Sun et al. |
| 2006/0277291 A1 | 12/2006 | Misbach |
| 2007/0083628 A1 | 4/2007 | Sandstrom |
| 2007/0083668 A1 | 4/2007 | Kelsey et al. |
| 2007/0156919 A1 | 7/2007 | Potti |
| 2007/0208840 A1 | 9/2007 | McConville et al. |
| 2007/0239842 A1 | 10/2007 | Knowles et al. |
| 2007/0297350 A1 | 12/2007 | Eilam |
| 2008/0037553 A1 | 2/2008 | Gilmartin et al. |
| 2008/0104247 A1 | 5/2008 | Venkatakrishnan et al. |
| 2008/0117808 A1 | 5/2008 | Sandstrom |
| 2008/0155424 A1 | 6/2008 | Moran |
| 2010/0042639 A1 | 2/2010 | Grinshpun et al. |

OTHER PUBLICATIONS

Rash, Wayne. "e-Security delivers the big security picture". Posted on Sep. 17, 2004 at https://www.infoworld.com/article/2667068/e-security-delivers-the-big-security-picture.html (Year: 2004).

DIRECT BINARY FILE TRANSFER BASED NETWORK MANAGEMENT SYSTEM FREE OF MESSAGING, COMMANDS AND DATA FORMAT CONVERSIONS

CROSS REFERENCE TO RELATED APPLICATIONS

This application is a continuation of U.S. application Ser. No. 15/912,603, issuing on Feb. 18, 2020 as the U.S. Pat. No. 10,567,474, which is a continuation of U.S. application Ser. No. 14/931,884, filed Nov. 4, 2015, issued on Mar. 13, 2018 as U.S. Pat. No. 9,917,883, which is a continuation of U.S. application Ser. No. 14/038,685, filed Sep. 26, 2013, now issued as U.S. Pat. No. 9,182,997 which is a continuation of a U.S. application Ser. No. 11/566,178, filed Dec. 1, 2006, which is incorporated by reference in its entirety and which claims the benefit of U.S. Provisional Application No. 60/866,208, filed Nov. 16, 2006, which is incorporated by reference in its entirety (and referred to herein with the reference number [5]).

This application is also related to the following, each of which is incorporated by reference in its entirety: [1] U.S. application Ser. No. 10/170,260, filed Jun. 13, 2002, entitled "Input-Controllable Dynamic Cross-Connect"; [2] U.S. application Ser. No. 10/192,118, filed Jul. 11, 2002, entitled "Transparent, Look-Up-Free Packet Forwarding Method for Optimizing Global Network Throughput Based on Real-Time Route Status"; [3] U.S. application Ser. No. 10/382,729, filed Mar. 7, 2003, entitled "Byte-Timeslot-Synchronous, Dynamically Switched Multi-Source-Node Data Transport Bus System"; [4] U.S. application Ser. No. 11/245,974, filed Oct. 11, 2005, entitled "Automated, Transparent System for Remotely Configuring, Controlling and Monitoring Network Elements"; and [6] U.S. application Ser. No. 11/563,079, filed Nov. 24, 2006, entitled "Intelligent Network Alarm Status Monitoring."

BACKGROUND

The present invention pertains to the field of telecom network management systems, in particular to network management communications.

Acronyms used in this specification are defined below:

| | |
|---|---|
| GUI | Graphical User Interface |
| HW | Hardware |
| IF | Interface |
| NE | Network Element |
| NMS | Network Management System |
| PC | Personal Computer |
| sw | Software |

Conventional telecom network management systems (NMS) rely on command and messaging based communications for transactions and information distribution between various elements of the NMS and the network being managed. Examples of such commonly used messaging and command based NMS communications techniques are various versions of Simple Network Management Protocol (SNMP), Transaction Language 1 (TL1) and Common Management Information Protocol (CMIP). Moreover, conventional NMS implementations are often based on complex, technology and system vendor specific concepts, such as Management Information Bases (MIBs), for storing or representing various sets of network management objects, and various types of methods to operate on, e.g., given MIB objects.

These conventional NMS transactions and methods are normally event-triggered such that they can occur spontaneously or in an unsolicited manner. For example, they may occur based on dynamic events that take place on network data plane, based on automated NMS response to particular information received from the network being managed, or based on human operator initiated network management operations. For instance, network defect or fault activations and de-activations cause NMS messages among various elements of NMS implementations with conventional NMS technologies. Likewise, individual transactions, such as accessing a given parameter at a network element (NE) (e.g., reading a NE performance monitoring status register or re-configuring a NE control register), involve their specialized messaging and command based transactions with conventional NMS techniques. Moreover, to complete even such a basic NMS transaction, several stages of protocol, message, language and data format conversions are involved with conventional NMS implementations. These messaging based prior art NMS schemes are prone to become overloaded during times of high loads of NMS and network event activities. As a consequence, conventional network management and NMS communications systems and methods are reactive in their nature and impulsive in operation, causing several significant problems inherent with them. These problems include the following:

- The conventional NMS performance degrades when the NMS capabilities are most urgently needed, e.g., during bursts of messaging and transaction triggering network events, e.g., major network failures.
- Several functional components of conventional NMS techniques are vendor dependent or vendor specific. This causes the full system integration to become complicated and requiring various stages of integration SW, i.e., middleware to be designed between the functional components, resulting in lost NMS transparency from NMS user IF to the network element HW, reduced system flexibility and increased cost.
- Many conventional NMS techniques are specific to certain protocols, languages or data formats, causing the need for various stages of protocol conversion agents and the like, further complicating the conventional NMS implementations while making them less transparent and less flexible.
- Since NMS operations with conventional systems and technologies are typically based on a predefined, fixed set of commands or methods (e.g., requests, responses etc. predefined atomic transactions) specific to and limited by the technologies in use at a given implementation, the scope of possible functionality supported through conventional NMS are commonly strictly restricted to only such a subset of capabilities of the components of the NMS implementation that is supported by each component throughout the implementation.

It is thus observed that, even with their exhaustive implementational complexity, conventional NMS techniques are usually inefficient in operation. Accordingly, there is a need for innovations that enable streamlined network management communications, providing more intuitive, transparent and flexible operational capabilities with architecturally improved scalability, reliability and performance, especially under heavy load of network management and network data plane event activities.

SUMMARY

Embodiments of the invention provide efficient systems and methods for unrestricted network management operations based on the transfer of binary network management data (NMD) files between a network management systems (NMS) server and remote network elements (NEs) being managed through the NMS.

In one embodiment, a method for managing NEs includes repeatedly, via periodical routines, transferring NE program and control files from NE-specific directories at the NMS server to their related NEs, and transferring NE status files from NEs to their associated directories at the NMS server. The NE control files represent the intended binary contents of their corresponding NE control register segments, and the NE status files represent the binary contents of NE status register segments within the memory space of their associated NEs.

In one embodiment, a network management system for configuring and monitoring remote NEs comprises an NMS file server for storing binary NMD files associated with the NEs. The system is configured to periodically transfer NMD files between the file server and the NEs. A graphical user interface (GUI) provides user access to the NMD files at the NMS file server. The intended actions associated with the NMD files transferred to the NEs generally occur as automatic consequences of the NEs storing these files at their local memories. The NMS GUI automatically displays current network status based on the NMD files transferred from the NEs to NMS file server. The NMS file server provides dedicated directories for NMS files of each NEs being managed through the NMS, and the NEs know which NMD file directories at the NMS server to access based on their unique NE IDs configured individually for each NE hardware unit, as the NE-specific NMD directory names at the NMS server, in an embodiment of the invention, include the NE ID for the NE associated with each directory.

Figure 1:
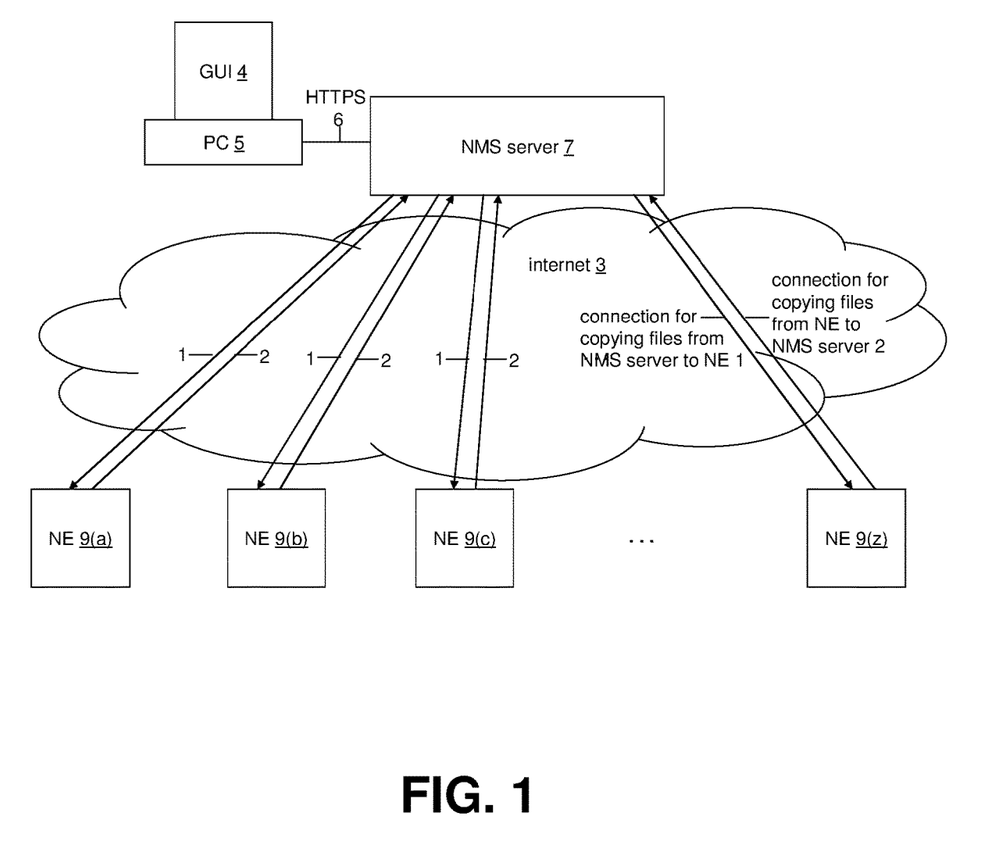
FIG. 1 illustrates the functional architecture for a network management communications system involving an NMS file server and a set of NEs, in accordance with an embodiment of the invention.
Figure 2:
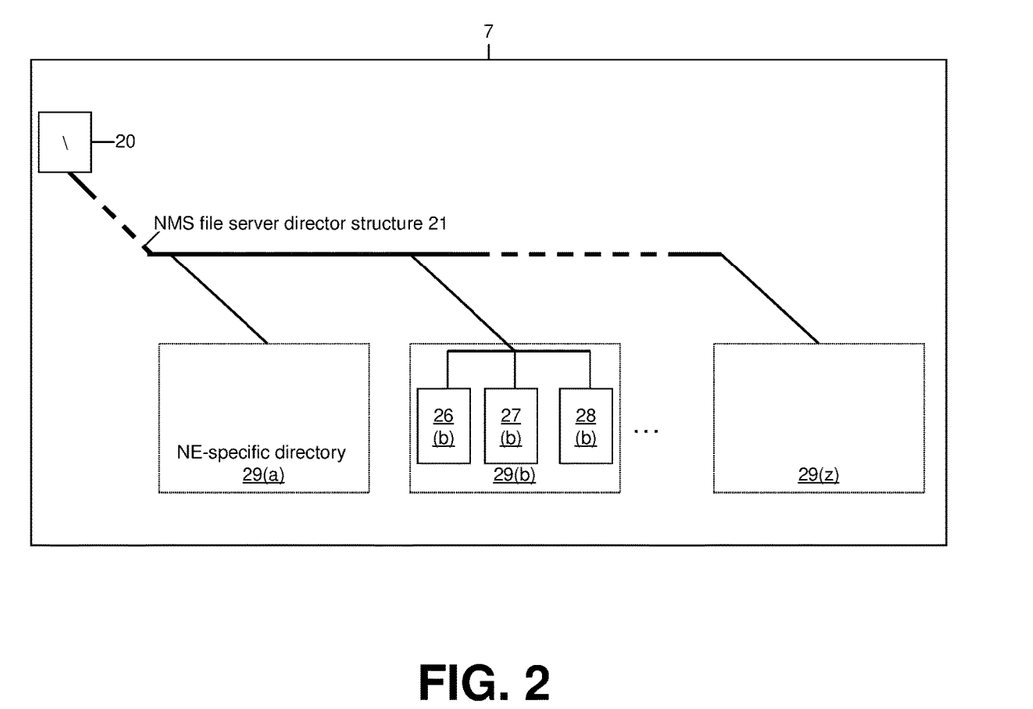
FIG. 2 is a diagram of a logical directory structure at the NMS file server shown in FIG. 1.

The following symbols and notations used in the drawings:

- A box drawn with a dotted line indicates that the set of objects inside the box form an object of higher abstraction level, such as in FIG. 2 an NE specific directory 29 comprising sub-directories 26, 27 and 28.
- Lines or arrows crossing in the drawings are decoupled unless otherwise marked.
- Arrows between boxes in the drawings represent a path of information flow and can be implemented by any communications means available, such as Internet or Local Area Network based connections. A line connecting elements is considered a bi-directional communication path unless a direction is indicated with an arrow.
- The symbol '\' represents a logical root of a file system or a directory structure.
- Three dots between instances of a given object indicate an arbitrary number of instances of such an object, e.g. NEs 9 in FIG. 1, repeated between the drawn instances.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

FIG. 1 presents an overview of functional architectural of the network management process of present invention. At a high-level, the NMS of the invention, via a set of automatic routines, transfers binary network management data (NMD) files between an NMS file server 7 and a set of NEs 9(a), 9(b), 9(c) etc. (later referred simply to as NEs 9, or NE 9 for any individual one of the NEs 9(a) through 9(z)), while network management actions occur as automatic consequences of the contents of the NMD files.

The NMS process of FIG. 1 is based on the following mutually asynchronous and conceptually de-coupled sub-processes:

1) A set of automatic file transfer routines transfers NMD files between the NMS server 7 and the NEs 9;
2) The NEs perform on their end the appropriate NMS actions associated with the NMD files;
3) The NMS GUI 4 acts on the NMD files at the NMS server 7, to perform the NMS transactions on its end.

The sub-process 1) in one embodiment is based on a secure Network File System (NFS), with the NMS server 7 providing NFS server and the NEs 9 NFS client functionalities. This sub-process further comprises the below two NMD file transfer routines that the NEs repeat periodically, e.g. every 1, 5 or 10 seconds:

a) The NFS clients of the NEs 9 look for and copy 1 their associated NMD program and control files, referred to as NE configuration files, from directories at the NFS server 7 designated for configuration files intended for their respective destination NEs, over a network 3 to the local memories at the NEs. A NE looks for its new program and control files at their respective, predefined directory locations designated to that NE at the NMS server, and after copying such files from the NMS server, stores its program files at a program memory segment, and its control file at a control register segment within its local memory space.

b) In addition, the NFS clients at the NEs 9 copy 2 contents of their status register segments within their local memories via a type of NMD file referred to as NE status file over a network 3 to their associated directories at the NMS server 7 designated to status files from the individual NEs managed through the NMS.

In one embodiment, the above routines of a) transferring NE configuration files from the NMS server to NEs, and b) transferring NE status files from NEs to the NMS server are independent operations, i.e., neither one either triggers the other or is caused by the other.

The sub-process 2) in one embodiment is performed by the NE HW, e.g. per referenced application [5], automatically based on the binary contents of the NE control files, normally without further involvement by either NMS or NE SW. An exception to that is a case when a NE control file contents contain such a value in a particular NE control register, referred to as reboot control register, that is intended to cause the NE SW to reboot, in which case the NE SW will do a reboot of a type indicated by the reboot control register value. Aside this reboot exception, i.e., in cases when the reboot control register in a NE control file does not indicate a reboot action, the NE hardware automatically, without SW involvement, completes the network management actions indicated by the contents of new NE control files copied to the control register segment in its local memory space. The NE also copies to its program memory segment within its local memory space any new program files from its associated directory at the NMS file server designated for program files for that destination NE. In one embodiment, the program memory segment of a NE comprises multiple directories to allow storing multiple NE program files, and the value of the NE reboot control register indicates both whether the NE is to reboot, and using program files in which directory in the program memory segment. In addition, the NE HW automatically maintains and updates a set of NE status parameters in its status register memory space, and the NE SW reads the contents of this status register segment in the NE memory space to a NE status file that the NE copies 2 to an appropriate directory at the NMS server designated for status files from that source NE. In one embodiment, the NE copies 2 also the contents of its control registers via its NE status file back to the NMS server, allowing the user to verify the actual values of also the NE control registers via GUI 4. Hence, the phrase status NE status file herein shall include the contents of both the NE control and status registers, collectively referred to as NE device registers.

The sub-process 3) in one embodiment is performed by the NMS GUI SW 4 via providing access in a human understood format for the system user to the NMD files at the NE-specific directories at the NMS file server 7. This sub-process involves write and read access to control register values within the NE control files via the NMS GUI, producing NE program files to appropriate folders at the file server 7, and read access to the NE status files at the server 7. Moreover, in one embodiment the NMS GUI 4 displays notifications of significant events in the network such as NE alarm activations according to principles per referenced applications [5] and [6].

It is seen from the above discussion that the three main sub-processes of the NMS process of the invention are mutually de-coupled, other than through the contents of the NMD files that indicate the intended actions to be performed by other elements of the system to complete any given network management operation. Compared against prior art messaging and command based NMS techniques, this de-coupling between the functional elements of the network management system and methods of the present invention yields several benefits over the, including the below ones:

Heavy load of NMS or network event activity on one element of the system per the invention does not negatively interfere with other elements. For instance, while e.g. the NMS server 7 is heavily loaded during for instance a network service contract testing period when the NE control parameters are changed rapidly for test case purposes, the file transfer routine, the SW of the NEs, and even the HW of those NEs not under the test, are not at all impacted. Likewise, a heavy load of e.g. network defect activity at a given NE does not impact the NMD file transfer routines, the other NEs, the NMS server or GUI SW; instead, in one embodiment, e.g. per the referenced applications [5] and [6], just a single NE alarm notification is generated at the NMS GUI when a previously defect-free NE enters a defected state. As a consequence, the NMS per the invention is highly reliable and scalable, providing a predictable, steady performance under any load of NMS and network event activities.

The system per the invention is flexible regarding any changes needed to the implementation of either the NE 9, NMS server 7, GUI 4 etc. elements of it, as well as any changes to the network 3 through which the NMS and NEs transfer files, or to the way the GUI and the NMS file server communicate 6. Consequently, any of these system elements can change without having to redesign the rest of the NMS system.

The system per the invention provides transparent NMS communications all the way from the NMS GUI 4 to the NE 9 hardware device registers and back, without intermediate messaging protocol conversion or command translation agents etc. non-transparent middleware common with prior art NMS communications techniques. Accordingly, the invention inherently enables a more intuitive and flexible network management, by allowing direct access to the NE parameters of interest via an intuitive and transparent GUI, without requiring the network operator's personnel to know about or deal with the peculiarities of any intervening messaging protocol or command language syntax.

A possible implementation of the NMS of the invention further comprises a PC 5 hosting the NMS GUI application, e.g. HTML based web browser 4. In such a system implementation, the GUI 4 connects to the NMS server 7 over a secure HTTP connection 6. Regarding FIG. 1, it shall be understood that there is no implied limit to the number of NEs supported by this network alarm monitoring system, but that instead this system architecture supports an arbitrary number of NEs 9, and that there can equally well be multiple physical NMS server 7 and user computers 5 as well as multiple concurrent NMS GUI applications 4.

FIG. 2 illustrates a logical directory structure according to the invention at the NMS file server 7 for storing NMD files for a set of NEs managed through the NMS. Below the file server directory root 20, there is a directory structure 21 holding a set of NE-specific directories 29(*a*) through 29(*z*) (later simply directories 29 for the set, or a directory 29 when referring to any one of the similarly structured directories 29(*a*), 29(*b*), 29(*c*) etc.). Each of the directories 29 stores NMD files for its associated NE 9, for example directory 29 (*b*) at the NMS server 7 stores NMD files associated with NE 9(*b*) (FIG. 1). In one embodiment, each directory 29 comprises subdirectories 26, 27 and 28 for holding program, control and status files, respectively, of the NE associated with the directory. These subdirectories have been drawn in FIG. 2, as an example, for the case of directory 29(*b*) associated with NE 9(*b*) (FIG. 1). Each of the NE-specific directories 29, however, have similar subdirectory structure as the directory 29(*b*).

Operation of the NMS file server 7 in a process of configuring and monitoring a given NE 9 in one embodiment is based on the below principles:

1) A system user, e.g., a network operator staff member, produces desired types of NE program and control files for a NE 9, using the NMS GUI client 4 and related server software at the NMS files server 7, into the program file directory 26 and control file directory 27 associated with the NE 9.

2) The NE 9, via a repeating routine, for instance every fifteen seconds, looks for and copies these files from its associated directories 26 and 27 at its NMD directory 29 at the NMS server to their appropriate locations within the local memory space of the NE. The NE will consequently autonomously complete on its end the NMS operations indicated via each new NE configuration file.

3) The NE 9, also via a repeating routine performed e.g. once every second, copies the contents of its device status registers via its NE status file to the folder 28 at its directory 29 at the NMS server 7. The NMS SW will consequently display NE status data, along with a new NE alarm notification as necessary, to the user via the GUI 4, based on the contents of the latest NE status file at its associated directory 28 at the NMS server 7, in one embodiment utilizing the network alarm monitoring principles per the referenced applications [5] and [6].

The management process for a group of NEs, e.g. 9(*a*), 9(*b*) and 9(*c*) in FIG. 1, is based on simply repeating, or executing in parallel, the management process of a single NE described above. Copying of files between directories at the NMS server 7 and the NEs 9 in one embodiment is based on secure NFS, specifically NFS version 4 in one embodiment. Also, in one embodiment, each NE hardware unit 9 is identified by its unique NE ID number configured at the factory on a non-volatile memory, e.g. flash drive, for each NE unit 9, and the names of the NE-specific directories 29(*a*) through 29(*z*) at the file server 7 include the NE ID of their related NEs, based on which each NE 9 knows to access its appropriate directory 29 at the NMS server 7.

It is observed that a need for identifiers for source, destination, message or transaction is avoided with the present invention for NMS communications between the NMS server 7 and the NEs 9, in part via the use of NE-specific directories at the NMS file server 7 for storing the NMD files associated with each one of NEs 9(*a*) through 9(*z*) (FIG. 1). Note that transaction, source, destination etc. identifiers are usually necessary with prior art NMS communications schemes, per the prior art messaging protocols (e.g. SNMP, CMIP, TL1 etc.), requiring related NMS messaging protocol processing to be performed by prior art NMS and NE devices, thus making the prior art network management systems implementation, operation and administration more complicated and less flexible compared to the plain binary NMD file transfer based NMS communication of the present invention. Besides its more straightforward and transparent implementation and more flexible and intuitive operation, benefits of the invention enabled via the NE-specific NMD file folders include elimination of NMS communications overhead that is needed with prior art system for their NMS messaging protocols, and the clarity and intuitiveness of the NMS file server structure based on a repeated set of similar NE specific directories 29(*a*) through 29(*z*) for the set of NMD files 26, 26 and 28 per each NE 9(*a*) through 9(*z*).

It shall be understood that the term directory herein refers to a file folder i.e. directory at any level of the file system hierarchy, and that e.g. phrase NE-specific directory can be used to denote a hierarchical directory with sub-directories for holding NMD files of a given NE, as well as a bottom level directory used to hold a single NMD file of a particular type. Also, it shall be understood that there can be any desired number of NE specific directories 29 at the NMS server 7, that there can be any desirable number of levels of file system hierarchy within directory structures 21, 26, 27, 28 and 29, and that the directory structure 21, as well as the sub-structures of directories 29, can include other directories and files in addition to the ones shown in FIG. 2.

Figure 3:
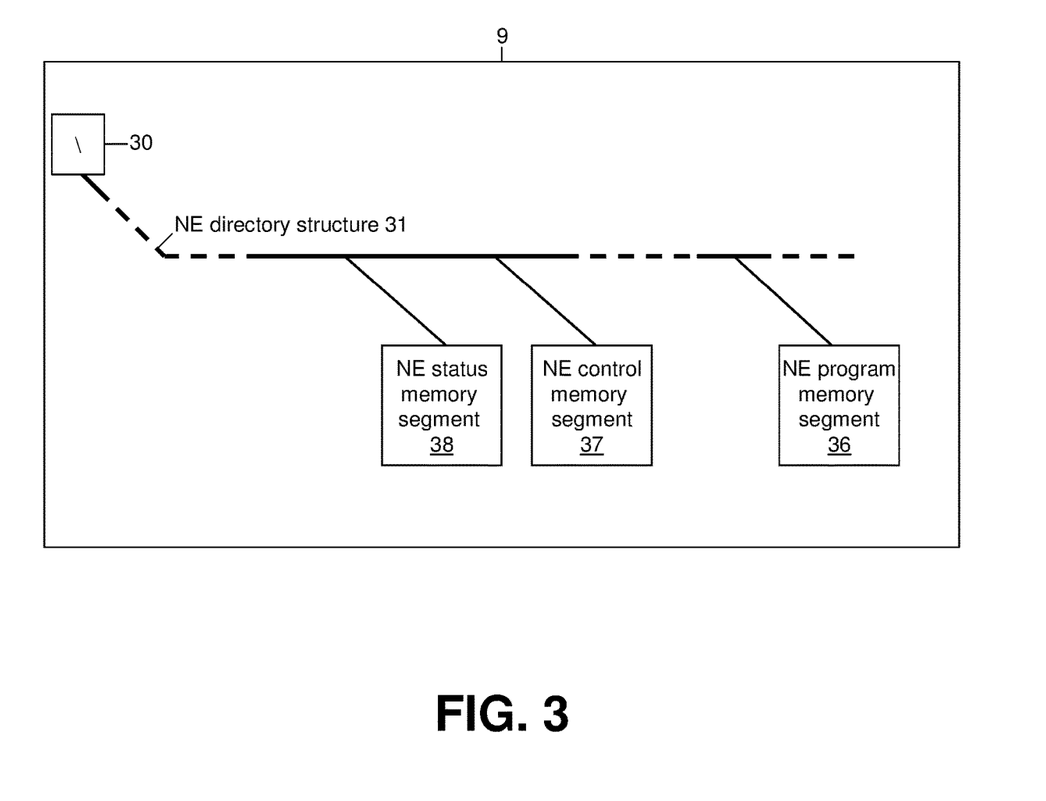
FIG. 3 is a diagram of a logical structure of a local memory space of an NE shown in FIG. 1

FIG. 3 illustrates logical structure of local memory space of each NE 9 of the network management system of the invention (FIG. 1). The embedded memory space of the NE 9 comprises a program memory segment 36, a control register segment 37 and a status register segment 38. It shall be understood that various embodiments of NEs 9 can have various other memory segments, e.g., RAM, in addition to the three segments shown in FIG. 3, and that there can be as many layers of hierarchy of NE logical directory structure 31 below its root 30 as desired in each embodiment, as well as that the shown memory segments 36, 37 and 38 can have sub-directories. Reference specifications for one embodiment of a NE, including NE device register descriptions with related application notes, are provided in the referenced application [5].

In one embodiment, the NE memory space is organized as a logical directory structure 31, with the NE program memory segment 36 forming a logical subdirectory at the NE for holding the NE program files, and the NE control register segment 37 and the NE status register segment 38 each forming binary files under the NE logical directory structure 31. The NE 9 may comprise a HW unit with an embedded microprocessor and a set of embedded memories organized from the NE SW perspective as a continuous directory structure. In one NE HW embodiment, the NE program memory directory 36 is a flash drive, and the NE control and status files are predefined address ranges within the embedded memory space of the NE microprocessor containing the NE device control and status registers, respectively. Furthermore, in one embodiment, the NE device registers are implemented within a digital logic device that is configured, at least in part via the NE program files stored at the directory 36. In such an embodiment, NE digital logic device completes on the NE side the network management operations indicated via each new NE control file 37, as well as produces and keeps updated a predefined set of NE status parameters on the NE status file 38. Such NEs capable of operating autonomously and dynamically with this type of NMD files, including with a NE program files 36 and control file 37 that are static for a duration of a network service contract the NE is deployed for, in one embodiment are based on principles of referenced applications [1], [2], [3], [5] and [6].

A possible NE hardware implementation comprises, besides the embedded microprocessor and its memories, a programmable logic device (PLD, or FPGA i.e. Field Programmable Gate Array) within which, in one embodiment, both the microprocessor as well as the hardware logic, including the NE device registers, are included. With the programmable NE hardware, the NE program files in the flash drive 36 (as well as files in directory 26 in FIG. 2) shall contain both a binary file for configuring the programmable hardware logic of the NE (its PLD/FPGA), as well as a binary executable program for the NE microprocessor. Various embodiments of NEs for the invention can naturally contain any number of microprocessors, logic devices as well as other hardware components.

The NE SW in one embodiment executes periodically, e.g. once every ten seconds, a repeating routine comprising the below steps:

1) The NFS client of the NE 9 looks for and copies to its local memory segments 36 and 37 new NE program and control files, respectively, at its associated directories 26 and 27 at the NFS server of the NMS server computer 7;

2) The NE HW automatically completes the NMS actions indicated via new NE control files 37;

3) The NE NFS client copies its status file 38 to its associated directory 28 at the NFS server 7.

While the step 2) generally is performed by the NE HW, the NE SW in one embodiment however checks the value of a particular address in the control register segment referred to as the reboot control register after it has copied a new NE control file 37 from the NMS server. In case that the reboot control register was set to a value indicating NE reboot action, the NE SW will perform a type of NE reboot specified by the value of the reboot control register. However, as a general rule, i.e., in cases that the reboot control register was not set in an active value, the NE HW will complete all the network management operations indicated by each new NE control file 37 automatically without any SW involvement. Benefits of this NE functional architecture per the invention include that the NE SW does not need to process the NE control or status files 37 and 38 or perform related consecutive actions, other than checking the reboot command register in the NE control files and rebooting the NE as necessary. Consequently, the processing load for the NE SW is significantly reduced while the entire system operation is made faster, transparent and more predictable and reliable via HW automation, and elimination of intermediary processing stages with the NMS communications.

Regarding the NE memory space structure depicted in FIG. 3, it shall be understood in various embodiments the NE control and status register segments 37 and 38 may consist of sub-segments in their respective address space ranges, that the device register segments 37 and 38 are not required to contain actual data storage elements for each of their bit and byte address locations, that any one or even all of the NE configuration file memory segments 36, 37 and 38 can comprise multiple files or directories, and that any two or more of these memory segments 36, 37 and 38 can logically be combined into a single file or directory.

CONCLUSIONS

This detailed description is a specification of various embodiments of the present invention. Specific architectural, system, process and logic implementation examples are provided in this and the referenced patent applications for the purpose of illustrating various embodiments and implementations of the invented concepts. Naturally, there are multiple alternative ways to implement or utilize, in whole or in part, the principles of the invention as set forth in the foregoing.

For instance, while the presentation of the network management system functional architecture of the invention (an overview of which is shown in FIG. 1) is reduced to illustrating the organization its basic elements, it shall be understood that various implementations of that architecture can have any number of NEs served by an NMS server, any number of NMS servers, and any number of NMS GUIs, etc. Also, in different embodiments of the invention, the sequence of software and hardware logic processes involved with the network management communications system can be changed from the specific sequence described, and the process phases of the network management methods could be combined with others or further divided in to sub-steps, etc., without departing from the principles of the present invention. For instance, in an alternative embodiment, the NMS server could copy status files from the NEs and copy configuration files to the NEs, instead of NEs copying their status files to the NMS server and copying configuration files from the NMS server. Moreover, the logical functions that are described as implemented in hardware could in alternative implementations be implemented in software, and vice versa.

Generally, those skilled in the art will be able to develop different versions and various modifications of the described embodiments, which, although not necessarily each explicitly described herein, utilize the concepts of the present invention and are thus included within its spirit and scope. It is thus intended that the specification and drawings of this patent application considered not in a restrictive sense, but as exemplary only, with the scope of the invention being indicated by the following claims.

What is claimed is:

1. An infrastructure management method comprising a set of actions:
    at a set of remote elements,
        (a) holding element-side copies of configuration data (CD) at a storage media, wherein the element-side copies are repeatedly synchronized with corresponding copies of the CD maintained as user accessible copies of the CD, and
        (b) performing operations, by digital logic, at least in part based on contents of the element-side copies of the CD;
    at a computer system,
        (a) holding the user accessible copies of the CD at a storage facility, and
        (b) enabling a user of the method, via a user interface, to access the user accessible copies of the CD to manage the set of remote elements; and
    via a network interface, repeatedly transferring the user accessible copies of the CD to the storage media for holding the element-side copies of the CD at the remote elements, to maintain synchronization between the accessed user accessible copies of the CD and the element-side copies of the CD,
    wherein (i) contents of the user accessible copies of the CD are generated automatically through derivation from one or more parameters defining a contract that the set of remote elements are deployed for, and (ii) the corresponding element-side copies of the CD drive contents of hardware logic control registers at the set of remote elements,
    and wherein the user interface enables the user to access, including view and modify, both the user accessible copies of the CD as well as the parameters defining the contract that the set of remote elements are deployed for, from which parameters the user accessible copies of the CD as well as the corresponding element-side copies of the CD, and consequently, the contents of the registers at the remote elements, are derived through automatic generation.

2. The method of claim 1, wherein a given one of its actions involving one or more of the remote elements is carried out by hardware logic of at least one of the remoted elements involved in the given action.

3. The method of claim 1, wherein said operations include connecting communications data between different network interfaces of the given remote element.

4. The method of claim 1, wherein the given remote element comprises programmable hardware logic implementing a logic design, and said operations include changing at least in part the logic design implemented by the programmable hardware logic of the given remote element.

5. The method of claim 1, wherein:
    said operations include producing contents for element-side copies of status data (SD) to be held at the storage media of the given remote element;
    the network repeatedly transfers the element-side copies of the SD to the storage facility of the computer system, with copies of the SD held at said storage facility referred to as user accessible copies of the SD; and the user interface enables the user to access contents of the user accessible copies of the SD.

6. An infrastructure management method comprising a set of actions as follows:
at a set of remote elements,
(a) holding element-side copies of status data (SD) at a storage media, wherein the element-side copies are repeatedly synchronized with corresponding copies of the SD maintained as user accessible copies of the SD, and
(b) producing contents, by digital logic, for the element-side copies of the SD;
at a computer system,
(a) holding the user accessible copies of the SD at a storage facility, and
(b) providing a user access, through a user interface, to the user accessible copies of the SD, for a user to monitor the set of remote elements; and
via a network interface, repeatedly transferring the element-side copies of the SD to the computer system, to be held as the user accessible copies of the SD at the storage facility of the computer system, in order to maintain synchronization between the element-side copies of the SD and the user accessible copies of the SD,
wherein the user interface displays, at least in part based on contents of the SD, status of defects at the remote elements, including a summarized representation of whether each given one of the remote elements has at least one active defect, with such an active defect indicating a detection of an operational fault condition monitored at a respective remote element.

7. The method of claim 6, wherein a given one of its actions involving one or more of the remote elements is carried out by hardware logic of at least one of the remoted elements involved in the given action.

8. The method of claim 6, wherein the user interface generates, at least in part based on contents of the SD, notifications of alarms occurring at the remote elements.

9. The method of claim 8, wherein any of the notifications of alarms is generated when the SD for the given remote element indicates that the given remote element has entered a state of one or more active monitored defects, and wherein whether a defect detectable at the given remote element is monitored is configurable via the user interface.

10. The method of claim 8, wherein any of the notifications of alarms identifies the remote element which had entered a state of one or more active monitored defects.

11. A system for interaction among a set of components, the system comprising:
at a first one of the components, digital logic for producing a series of management data units, with a given one of said data units providing an array of information fields including a certain information field whose contents are used to indicate an action on part of a second one of the components;
a wide area network for transferring the series of data units from said first component over the network to said second component to maintain synchronization between respective management data contents held at said first and second components; and
at said second component, digital logic for processing one or more of the information fields in the given data unit, with said processing involving performing the action as indicated by the contents of the certain information field,
wherein memories at each of said first and second components comprise respective segments for configuration and status files, and the given management data unit includes information segments corresponding to contents of both the configuration and the status files at said first and second components,
wherein, in a first mode of the system, in which the first component comprises a computer subsystem and the second component comprises its respective remote element instance, the certain information field, based on whose contents the performing of the action at the respective remote element instance is done, is included within the configuration file segment of a respective instance of the given management data unit,
wherein, in a second mode of the system, in which the first component comprises its respective remote element instance and the second component comprises the computer subsystem, the certain information field, based on whose contents the performing of the action at the computer subsystem is done, is included within the status file segment of a respective instance of the given management data unit,
and wherein the management data contents held at the computer system are accessible to a user of the system in order to enable the user to remotely manage one or more of said remote element instances.

12. The system of claim 11, wherein, in said first mode of the system, the producing of the management data unit is done automatically based at least in part on (i) information defining a service contract that the set of system components implement and (ii) specified dependencies between contents of said information defining the service contract and corresponding values in the array of information fields in the respective instance of the management data unit for configuring the respective remote element instance.

13. The system of claim 11, wherein at least one of
(i) said producing a series of management data units, and
(ii) said performing of the action as indicated by the contents of the certain information field
is carried out by hardware logic.

14. The system of claim 11, wherein, in said first mode of the system, the action by the respective remote element instance involves changing contents of a hardware logic control register of said remote element instance according to the certain information field, with said remote element instance referred to as a network element (NE).

15. The system of claim 14, wherein the control register contents impact processing of data received on a port of the NE, transmission of data on a port of the NE, or connection of data between ports of the NE.

16. The system of claim 14, wherein the control register contents control whether a given defect detected at the NE causes an alarm.

17. The system of claim 14, wherein the control register contents impact re-booting of the NE.

18. The system of claim 14, wherein the control register contents impact re-configuration of programmable hardware logic of the NE.

19. The system of claim 11, wherein, in said second mode of the system, the action by the computer system comprises updating a display of contents of the certain information field on a user interface of the computer system.

20. The system of claim 11, wherein, in said second mode of the system, the action by the computer system comprises generating an alarm notification concerning the respective remote element instance based on said remote element instance entering a state of it having one or more active monitored defects.

\* \* \* \* \*